United States Patent [19]
Wolf et al.

[11] 3,733,826
[45] May 22, 1973

[54] FUEL COOLED RAM AIR REACTION PROPULSION ENGINE

[75] Inventors: Robert L. Wolf, Chesterfield County, Va.; Rodney McGann, Northridge, Calif.

[73] Assignee: Texaco Experiment Incorporated, Richmond, Va.

[22] Filed: Feb. 10, 1964

[21] Appl. No.: 343,871

[52] U.S. Cl. ..........................60/263, 60/267, 60/270
[51] Int. Cl. ..................................................F02k 3/10
[58] Field of Search..........................60/35.3, 35.6 U, 60/35.6 W, 35.6 LL, 35.6 P, 35.6 BB, 35.6 RJ, 35.6 RT, 43, 263, 35.6

[56] References Cited

UNITED STATES PATENTS 3,067,594  12/1962  Bland et al. ...........................60/260
3,164,955  1/1965  Garraway...............................60/206

*Primary Examiner*—Samuel Feinberg
*Attorney*—Stowell and Stowell

EXEMPLARY CLAIM

1. A reaction propulsion system including means providing a combustion chamber having an impulse expansion outlet nozzle therefrom, means providing a ram air intake, means directing air from the ram air intake to the combustion chamber, a fuel storage chamber, multi-stage heat exchange means in heat exchange contact with the air in said air directing means, means directing fuel from said storage chamber through a first stage of said heat exchange means, an air compressor providing a portion of the air directing means between the heat exchange means and said combustion chamber, a multi-stage direct expansion turbine for driving said compressor, means directing at least a portion of fuel from the first stage of said heat exchange means through a first stage of said direct expansion turbine and then into a second stage of said heat exchange means, means directing at least a portion of fuel from the second stage of said heat exchange means through a second stage of said direct expansion turbine and then into said combustion chamber, a regenerative heat exchanger in said combustion chamber, and means for selectively directing a portion of the fuel passing through the first stage of said heat exchange means to said regenerative heat exchanger and then to the first stage of said turbine.

7 Claims, 1 Drawing Figure

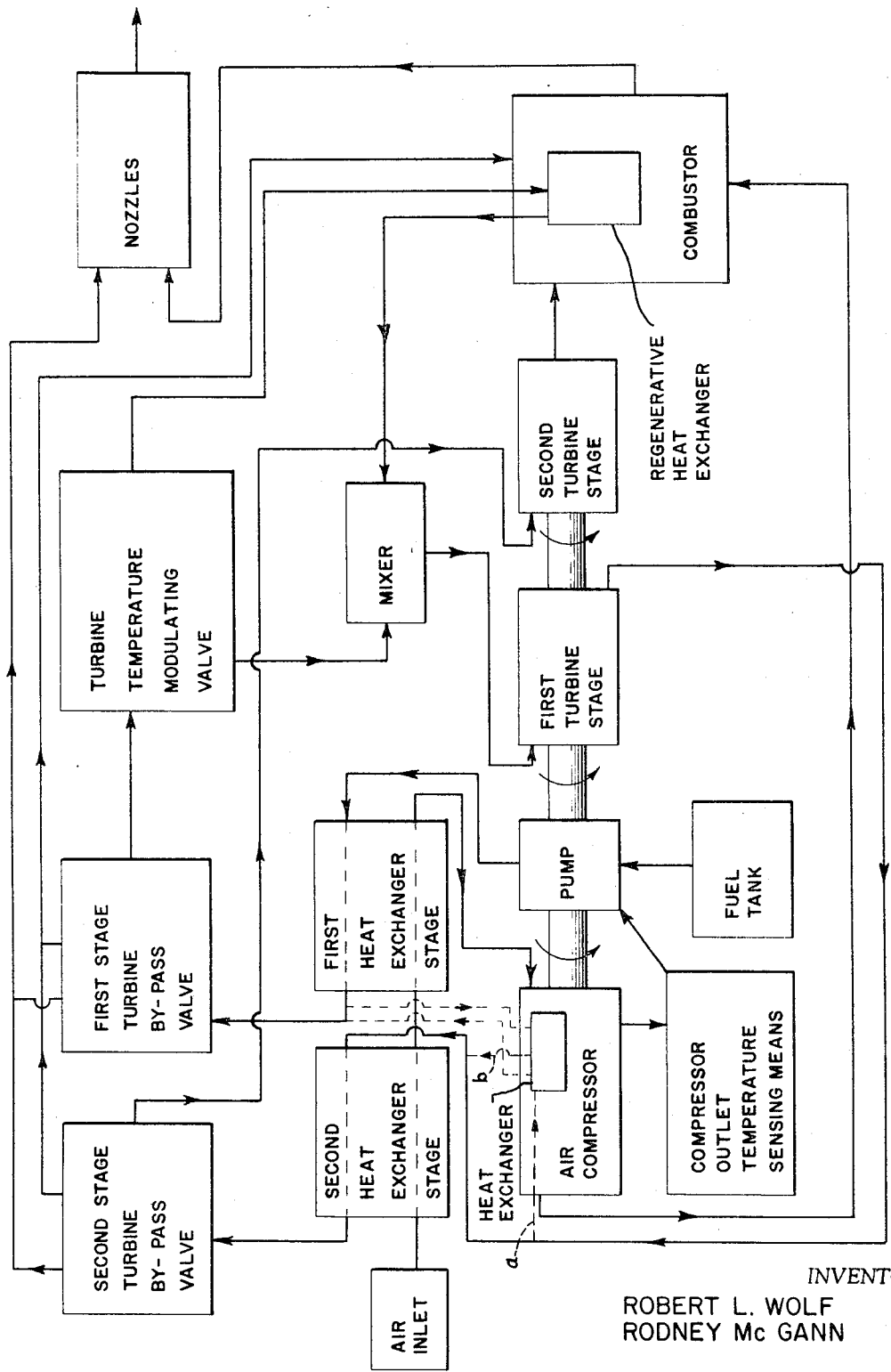

FUEL COOLED RAM AIR REACTION PROPULSION ENGINE

This invention relates to reaction propulsion engines and to methods of operating them and particularly to relatively small and lightweight air breathing reaction propulsion engines which will be able to efficiently accelerate a load from standstill to hypersonic speeds.

It is a principal object of the present invention to provide an air breathing reaction engine wherein a portion of the energy of the ram air is transferred to the fuel by heat exchange between the ram air and the fuel and thereafter the energy thus transferred is utilized, at least in part, by expanding the fuel or a portion thereof in a turbine driving an air compressor for the engine.

By locating one or more heat exchanger stages in the air inlet, such heat exchangers cool the ingested diffused air so that the engine downstream of the heat exchangers will not be subjected to temperatures exceeding, for example, that corresponding to about Mach 3 (about 650°F) during flight conditions of Mach 8 to 10.

A further object is to provide such an engine wherein the air stream is more easily compressed by cooling the ingested air prior to compression.

Another object of the present invention is to provide an engine having a regenerative heat exchanger in the combustion chamber of the engine whereby from launching velocities to the low hypersonic range of about Mach 4 the regenerative heat exchanger is employed to provide a portion of the energy required to operate the air compressor.

Another object of the invention is to provide an engine wherein the turbine, which may be multi-staged, is not aerodynamically coupled to the compressor, whereby the power supply to the turbine does not depend on air flow through the compressor; eliminating the need for variable geometry compressors or air bleeding while operating over a very wide range of flight conditions.

Another object of the present invention is to provide an air turbo engine wherein the air bypasses the turbine and the full compressor discharge pressure is discharged into the combustion chamber of the engine.

A further and more specific object of the present invention is to provide an air breathing reaction engine as aforesaid having a plurality of sequentially staged air-to-fuel heat exchangers, an air compressor-to-fuel heat exchanger, a regenerative combustor-to-fuel heat exchanger, one or more turbine stages across which the fuel is expanded to extract work to drive the other engine components, and valving and control means to route the air and fuel through such engine.

For high cooling efficiency, it is desirable that the fuel selected have a high heat capacity within the operating temperature range to provide for a high absorption of energy per pound of fuel. For efficient conversion of energy to thrust in the expansion process, the fuel should be one which provides a low average molecular weight in the exhaust gases. Within these limitations a considerable range of fuels is available from which selection may be made in the light of other properties of the fuels and the effect on the particular demands to be made on the engine. Among the fuels of interest are hydrogen and hydrogen-bearing compounds such as ammonia, methyl alcohol, ethyl alcohol, methane, ethylene glycol and cyclohexane.

Of these fuels, fuels which undergo endothermic decomposition or dissociation at temperatures between their storage temperature and the turbine and/or combustor entrance temperature are particularly suited for use in the engine. The most suitable fuels will dissociate at these temperatures to hydrogen and other relatively low molecular weight compounds without the formation of free carbon particles. Preferred examples of such fuels are ammonia, methyl alcohol, ethylene glycol and cyclohexane.

The preferred high heat capacity fuels, ammonia, methyl alcohol, ethylene glycol and cyclohexane, dissociate into hydrogen and nitrogen, hydrogen and carbon monoxide, hydrogen and carbon monoxide, and hydrogen and benzene, respectively. The dissociation is endothermic and the resulting gaseous products are of low molecular weight and are exceptionally clean; that is, they and their combustion products have little or no tendency to foul the engine as they contain no free carbon.

In general, the invention comprises the method of operating an air breathing propulsion system comprising transferring a portion of the energy from the ram air of the system to the fuel supply by indirect heat exchange between the ram air and the fuel; selectively directing a portion of the heated fuel through the turbine of a turbo-compressor; passing the cooled ram air through the compressor of the turbo-compressor; directing the fuel from the turbine, at least a part of the other portion of the fuel and the compressed air from the turbo-compressor into a combustion chamber; selectively transferring a portion of the energy from the combustion chamber of the system to a portion of the ram air heated fuel for the turbine of the turbo-compressor by indirect heat exchange between the combustion products and said portion of the fuel; and expanding the combustion products through an impulse expansion nozzle.

The invention will be more particularly described with reference to the drawing wherein a schematic representation of a system of the invention is illustrated.

Referring to the drawing, cold fuel is pumped to the desired pressure, by the turbine driven pump, from the fuel tank through a first heat exchanger stage. Ram air, following a conventional diffuser, is passed in indirect heat exchange relationship with the fuel in two heat exchanger stages, whereby the temperature of the fuel is raised and the temperature of the inlet air is cooled.

The rate of flow of fuel to the ram air heat exchanger stages may be controlled within wide limits by varying the output from the fuel pump or by providing a control valve in the outlet line from the fuel pump to the heat exchanger. The pump output volume or the control valve may be manually controlled and/or as indicated in the drawing, the control of the pump output or control for the output control valve may be provided by the compressor outlet temperature sensing means which would insure that sufficient fuel is passed to the heat exchanger to maintain limits on the turbine inlet temperature and the compressor discharge temperature.

The heated fuel is then passed to the first stage turbine bypass valve, and a portion of the fuel not required to drive the turbine may be directed into the combustor as indicated in the drawing. It will also be appreciated that the fuel passing directly from the turbine bypass valve to the combustor may be expanded through a thrust nozzle positioned within the combustor or all or a portion of this fuel may be expanded through a thrust nozzle external of the combustor as illustrated. The use of such a thrust nozzle has particular utility where the amount of fuel needed to cool the ram air is greater than the amount which could be burned stoichiometrically with the available air supply.

The portion of the fuel heated in the first air inlet heat exchanger stage which is required to drive the first turbine stage is passed through the first stage turbine bypass valve to a turbine temperature modulating valve. The turbine temperature modulating valve, after sensing the temperature of the fuel passed thereto, distributes a portion thereof to the regenerative heat exchanger, located in the combustor, and a portion to the mixer. In the regenerative heat exchanger, the fuel directed thereto is further heated by combustion of the fuel from the turbine bypass valve and by combustion of the fuel from the turbine with the compressed air from the air compressor. The heated fuel from the regenerative heat exchanger also passes to the mixer where it is mixed with the cooler heated fuel from the turbine modulating valve and the resulting mixture is directed to the first turbine stage where it is expanded and a portion of its energy removed in driving the fuel pump and the air compressor.

The exhaust fuel discharging from the first turbine stage is cooled due to the fact that work has been extracted from it, and also it is at a lower pressure than on entry into the turbine. This cool low pressure fuel is delivered to a second heat exchanger stage. Such second stage is located forward in the engine and inlet air initially passes therethrough.

It will be understood that the terms first and second refer to the fuel flow path from the tank to the combustor and/or nozzles. Obviously the air passes first through the second fuel heat exchanger stage, then through the first fuel heat exchanger stage, and the cooled air issuing from these sequential stages is passed through the air compressor and the compressed air is then directed to the combustor.

In order to further cool the air to effect lower engine temperature downstream of the staged heat exchangers a further fuel heating heat exchange means associated with the air compressor may be provided. The details of such further heat exchange means are not considered material to the present invention. Reference may be had to the inventors' U. S. patent application entitled "Reaction Propulsion Engine and Method of Operation" (Case D), Ser. No. 324,958, filed Nov. 20, 1963, for the exact manner in which such a heat exchanger may be provided in the compressor stator sections. The fuel may be serially passed through the compressor heat exchanger after it issues from the first ram air heat exchanger stage, as indicated by the dashed-line flow path in the drawing. Alternatively, depending on the relative temperatures, fuel entering or issuing from the second ram air heat exchanger stage could be routed through such compressor heat exchanger (as shown, for example, by dash lines a and b), or fuel to or from both ram air exchangers could be passed through a suitable multipath compressor heat exchanger, in a similar manner, not shown.

As the fuel passes through the second heat exchanger stage it is again heated while cooling the hottest input ram air, and then passes to a second stage turbine bypass valve, as shown. Such valve, like the first one previously described, may be conditioned to pass all of the fuel to a second turbine stage for expansion thereacross. The exhaust from the second turbine stage is directed to the combustor where it, in turn, is burned in the compressed air as indicated above.

The second stage turbine bypass valve is controlled to direct that portion of the fuel not required to drive the second turbine stage into either the combustor, or a thrust nozzle positioned in the combustor, or a thrust nozzle external thereto; all as previously described with respect to the first stage turbine bypass valve, and as illustrated schematically by the flow lines in the drawing. Suitable thrust nozzle means are disclosed in the inventors' U. S. patent application noted above; and means to direct the fuel within the combustor are disclosed in the inventors' U. S. patent application entitled "Reaction Propulsion Engine and Method of Operation" (Case B), Ser. No. 324,932, filed Nov. 20, 1963.

The products of combustion of the fuel, directed to the combustor from the turbine bypass valves and exhausting from the second turbine stage, issue through the outlet nozzle of the engine to produce thrust. It is a function of the turbine temperature modulating valve to pass sufficient fuel to the regenerative heat exchanger to insure that the fuel mixture finally expanded through the turbine has a high enough energy level to satisfy the requirements of the turbine in operating the fuel pump and the compressor. Controllers for fuel flow through the turbine bypass valve and for the turbine temperature modulating valve may be fuel, turbine or compressor temperature responsive, altitude responsive, vehicle speed responsive, or turbine speed responsive or a combination of two or more of these factors.

As the Mach number of the vehicle increases, less and less of the fuel directed from the first stage turbine bypass valve to the turbine modulating valve is passed to the regenerative heat exchanger as a greater amount of energy is imparted to the fuel from the ram air. Generally, above Mach 3 the temperature of the ram air is such that the entire energy requirements of the turbine are provided by the air inlet heat exchangers and none of the fuel is required to be passed through the regenerative heat exchanger in the combustor. However, some fuel may be passed to the regenerative heat exchanger at all times to prevent overheating of the structure.

As hereinbefore discussed, for high cooling efficiency and to provide a high absorption of energy per pound of fuel, it is desirable that the fuel selected have a high heat capacity within the expected operating temperature range of the engine. At the same time, for efficient conversion of energy into thrust in the expansion process, the fuel should be one which provides low average molecular weight components in the exhaust gases. Thus, cryogenic hydrogen or fuels which undergo endothermic decomposition at temperatures between their storage temperature and the turbine and/or combustor entrance temperatures are particularly suited for use in the system of the invention.

When such fuels are used at relatively low flight speeds of about below Mach 1.5 in a system where the incoming air and a regenerative heat exchanger are used to heat the fuel prior to combustion, there will be very little heating of the fuel by the incoming air. Most of the heat required to decompose and/or evaporate the fuel and heat the fuel to the turbine inlet temperature required to operate the air compressor will come from the regenerative heat exchanger. As the flight speed and the temperature of the inlet air increase, there will be more cooling of the air ahead of the compressor and hence more heating of the fuel prior to its passage to the turbine and/or combustion zone. Thus, less heat will be required from the combustion zone via the regenerative heat exchanger and less fuel will be programmed through the regenerative heat exchanger located in the combustion area prior to its expansion across the turbine. At still higher flight speeds, all of the required heat will come from the cooling of the inlet air and no heat will be taken from the combustion zone via the regenerative heat exchanger.

The air to fuel indirect heat exchangers located ahead of the air compressor serve three main purposes. The first is to increase the available turbine work of the fuel by heat addition without combustion while lowering the work required to compress the air thereby making the cycle more efficient. The second is to cool the incoming air to acceptable temperature levels, preferably below 1,200°F, to avoid excessive exit temperatures and dissociation of the products in the combustion zone. The third is to increase the density of the air through cooling to give a higher mass flow per unit of compressor frontal area and a resultant higher level of thrust.

At higher flight Mach numbers, it becomes increasingly important to cool the incoming air down to acceptable levels for the compressor. It may then become necessary to run either or both of the ram air heat exchanger stages richer than at lower Mach numbers, i.e., using an amount of fuel in excess of that which can be expanded across the turbine stages without overspeeding the rotating assembly. The excess fuel is either passed directly to the combustor for combustion along with the fuel that has been expanded across the second turbine stage or directed to nozzles external thereto. A portion of the fuel used in cooling the inlet air may be burned stoichiometrically with the air in the combustor while the remainder may be expanded directly to the atmosphere through a separate thrust nozzle as described hereinbefore. The proportion separately expanded is determined by the maximum exhaust gas temperature and the maximum degree of dissociation to be maintained. The use of endothermically dissociating fuels according to the process of the invention minimizes the expenditures of uncombusted fuel.

It will be apparent that in the described air breathing reaction engine cycle the fuel requirements at high flight speeds are controlled by the cooling capacity of the fuel. More fuel is required to cool the air than is required for either turbine power or combustion. Therefore, any increase in cooling capacity of the fuel will result in a lower fuel requirement and an increased fuel specific impulse. In accordance with the present invention, an arrangement of components and a method of operation has been described which will significantly increase the cooling capacity of the fuel. By the provision of multiple stage cooling of the inlet ram air, the cooling capacity of the fuel is increased by reason of the fact that the fuel is cooled when it is expanded across a turbine stage. It follows, therefore, that additional turbine stages and ram air heat exchanger stages may be built up as engine components in a manner similar to that already described and taught by this invention, if desired.

Although the increase in the fuel cooling capacity of the engine, particularly at high flight speeds, is the most marked advantage provided by the invention; a further advantage is gained because the internal fuel pressure is effectively reduced when the fuel passes through the higher temperature forward heat exchanger stage. Such pressure reduction will lower the design and stress requirements of such heat exchanger component.

The present invention resides in the engine component array as described and shown schematically in the accompanying drawing, and the following examples of methods of operation of such engines.

EXAMPLE I

An engine of the type illustrated in the drawing can be operated efficiently through the velocity range from static launch to Mach 10 and at altitudes up to 150,000 feet using the endothermically dissociating fuels of the invention or cryogenic hydrogen. Below about Mach 4 heat is added to the fuel in the regenerative heat exchanger to provide enough energy to drive the turbine without the use of auxiliary fuel combustion ahead of the turbine. Above about Mach 4 none of the fuel is passed to the regenerative heat exchanger as inlet air heating of the fuel provides all of the energy requirement of the turbine.

EXAMPLE II

An engine of the type illustrated in the drawing and operated as in the above Example develops a maximum thrust level which is dependent upon many factors such as compressor pressure ratio and diameter; operational time; air inlet and combustor nozzle size; size, weight, and cost of payload, etc. Obviously an optimum engine design for maximum developed thrust will be dictated by these and other factors. To provide greater thrust a plurality of such engines may be arranged in a cluster. Each engine in the cluster will have a separate rotating turbine-compressor assembly, combustor, and reaction propulsion nozzle means; although common shrouding of the separate air inlets and exhaust nozzles may be provided.

Related subject matter is disclosed in co-pending application Ser. No. 152,097, Robert L. Wolf et al., filed Nov. 13, 1961.

Where desired, the cold fuel exhausting from the second turbine stage may be utilized to cool engine parts such as the combustor case, exhaust nozzle, etc., prior to combustion of the fuel with the compressed air in the combustor. Similarly, at lower flight speeds and inlet air temperatures, some of the air discharged from the compressor could be directed between the combustor wall and a liner to provide wall cooling to the load-carrying shell.

A composite air breathing and rocket engine may be provided in accordance with the invention, since the air combustion characteristics of the combustor would be only slightly affected by using the reaction propulsion nozzle thereof to expand the rocket products to effect rocket propulsion. A suitable rocket fuel such as a $LOX-LH_2$ may be expanded in a rocket chamber located centrally of the combustor and nozzle assembly.

We claim:

1. A reaction propulsion system including means providing a combustion chamber having an impulse expansion outlet nozzle therefrom, means providing a ram air intake, means directing air from the ram air intake to the combustion chamber, a fuel storage chamber, multi-stage heat exchange means in heat exchange contact with the air in said air directing means, means directing fuel from said storage chamber through a first stage of said heat exchange means, an air compressor providing a portion of the air directing means between the heat exchange means and said combustion chamber, a multi-stage direct expansion turbine for driving said compressor, means directing at least a portion of fuel from the first stage of said heat exchange means through a first stage of said direct expansion turbine and then into a second stage of said heat exchange means, means directing at least a portion of fuel from the second stage of said heat exchange means through a second stage of said direct expansion turbine and then into said combustion chamber, a regenerative heat exchanger in said combustion chamber, and means for selectively directing a portion of the fuel passing through the first stage of said heat exchange means to said regenerative heat exchanger and then to the first stage of said turbine.

2. The invention defined in claim 1 wherein control for said means for selectively directing a portion of the fuel from said first heat exchanger stage through the regenerative heat exchanger is provided by the temperature of the fuel passing from said first heat exchanger stage.

3. An air breathing reaction propulsion system according to claim 1 further including additional heat exchange means in heat exchange contact with said air compressor, and means directing fuel exiting from said first stage of said multi-stage heat exchanger through such additional heat exchange means.

4. An air breathing reaction propulsion system according to claim 1 further including additional heat exchange means in heat exchange contact with said air compressor, and means directing fuel exiting from said first stage of said multi-stage turbine through such additional heat exchange means.

5. An air breathing reaction propulsion system according to claim 1 further including additional heat exchange means in heat exchange contact with said air compressor, and means directing fuel exiting from said second stage of said multi-stage heat exchanger through such additional heat exchange means.

6. A reaction propulsion system according to claim 1 including, in combination therewith, a rocket fuel source, and means directing the expansion products from said rocket fuel source into the impulse expansion outlet nozzle of said combustion chamber.

7. A reaction propulsion system including means providing a combustion chamber having an impulse expansion outlet nozzle therefrom, means providing a ram air intake, means directing air from the ram air intake into the combustion chamber, a fuel storage chamber, heat exchange means in heat exchange contact with the air in the air directing means, means for directing a portion of the fuel from the fuel storage chamber through said heat exchange means, a dual stage direct expansion turbine, means for directing a portion of the fuel issuing from the heat exchange means into the first stage of the dual stage turbine, means directing the fuel exhausting from the first stage of the dual stage turbine into said heat exchange means, means directing a portion of the reheated fuel issuing from the heat exchange means into the second stage of the dual stage turbine, an air compressor between the ram air intake and the combustion chamber driven by said dual stage turbine, means directing fuel exhausting from the second stage of the dual stage turbine and at least a part of the other portion of the fuel by passing the dual stage turbine into the combustion chamber, and expanding the products of combustion issuing from the combustion chamber through the outlet nozzle.

* * * * *